(12) United States Patent
Simon et al.

(10) Patent No.: US 11,313,283 B2
(45) Date of Patent: Apr. 26, 2022

(54) LUBRICATION OF A PLANET-CARRIER FOR A MECHANICAL REDUCTION GEAR OF A TURBINE ENGINE, IN PARTICULAR OF AN AIRCRAFT

(71) Applicant: SAFRAN TRANSMISSION SYSTEMS, Colombes (FR)

(72) Inventors: Adrien Louis Simon, Moissy-Cramayel (FR); Mathieu Jean Charrier, Moissy-Cramayel (FR); Jean-Charles Michel Pierre Di Giovanni, Moissy-Cramayel (FR); Simon Loic Clement Lefebvre, Moissy-Cramayel (FR); Guillaume Jean Pierre Robinet, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 141 days.

(21) Appl. No.: 16/790,360

(22) Filed: Feb. 13, 2020

(65) Prior Publication Data
US 2020/0300173 A1 Sep. 24, 2020

(30) Foreign Application Priority Data
Feb. 14, 2019 (FR) ...................................... 1901524

(51) Int. Cl.
*F02C 7/36* (2006.01)
*F02C 7/06* (2006.01)

(52) U.S. Cl.
CPC .................. *F02C 7/36* (2013.01); *F02C 7/06* (2013.01); *F05D 2220/323* (2013.01); *F05D 2240/128* (2013.01); *F05D 2240/50* (2013.01); *F05D 2240/60* (2013.01); *F05D 2260/98* (2013.01)

(58) Field of Classification Search
CPC ........ F02C 7/36; F02C 7/06; F05D 2220/323; F05D 2240/128; F05D 2240/50; F05D 2240/60; F05D 2260/98; F16H 57/0482; F16H 57/042; F16H 57/0479; F16H 57/082; F16H 57/043; F16H 1/32; F16H 57/0412; F16H 57/0456
See application file for complete search history.

(56) References Cited

FOREIGN PATENT DOCUMENTS

FR 3065773 A1 * 11/2018 ......... F16H 57/0431

* cited by examiner

*Primary Examiner* — Jacob M Amick
*Assistant Examiner* — Charles J Brauch
(74) *Attorney, Agent, or Firm* — Womble Bond Dickinson (US) LLP

(57) ABSTRACT

The invention relates to the lubrication of a planet-carrier for a mechanical reduction gear of a turbine engine, in particular of an aircraft, said planet-carrier comprising a cage defining an internal housing intended to receive a central sun gear with an axis of rotation X, and an annular row of planet gears arranged around the sun gear, said cage comprising two annular walls that are radial with respect to said axis X, and connected to one another at their outer periphery by a cylindrical wall of axis X, at least one of these radial walls comprising orifices for mounting the axes of said planet gears, and the cylindrical wall comprising through-holes for the passage of the gearings of the planet gears so that they may engage with a gearing of the ring gear, which is intended to extend around the planet gears and the cage.

17 Claims, 4 Drawing Sheets

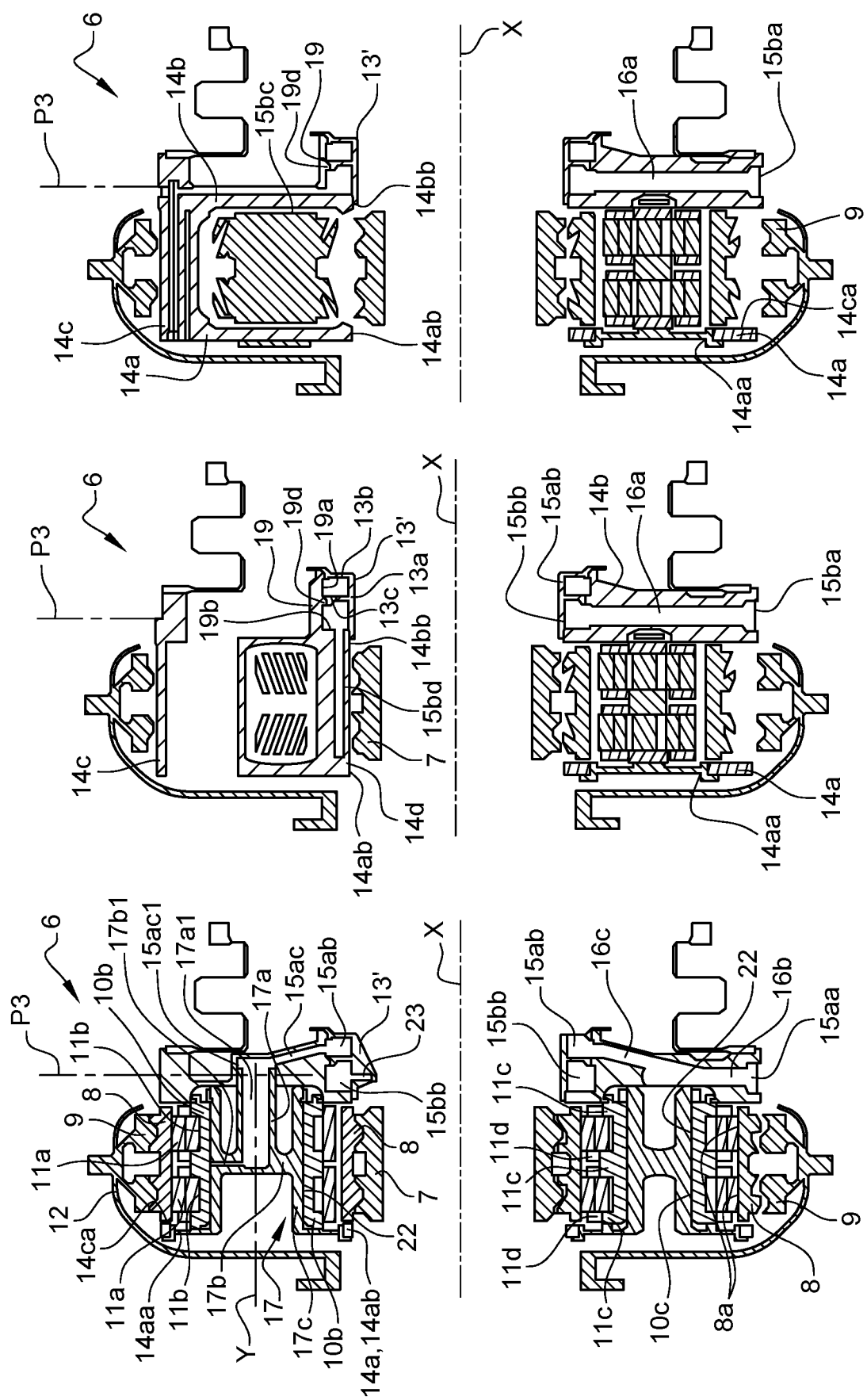

LUBRICATION OF A PLANET-CARRIER FOR A MECHANICAL REDUCTION GEAR OF A TURBINE ENGINE, IN PARTICULAR OF AN AIRCRAFT

TECHNICAL FIELD OF THE INVENTION

The present invention relates to the field of a mechanical reduction gears for turbine engines, in particular of an aircraft.

TECHNICAL BACKGROUND

The state of the art comprises, in particular, documents WO-A1-2010/092263, FR-A1-2 987 416, FR-A1-3 041 054, EP-A2-3 109 514, EP-B1-2 844 855, EP-A1-2 615 335, WO-A1-2019/016463 and EP-A2-1 114 949.

The purpose of a mechanical reduction gear is to change the speed and torque ratio between the input axis and the output axis of a mechanical system.

The new generations of bypass turbine engines, in particular turbine engines with high dilution rates, comprise a mechanical reduction gear that drives the shaft of a fan. Usually, the purpose of the reduction gear is to transform the "fast" rotational speed of a power turbine into a slower rotational speed for the shaft driving the fan.

This type of reduction gear comprises a central pinion, termed sun gear, a ring gear and pinions termed planet gears, the latter engaging between the sun gear and the ring gear. The planet gears are maintained by a chassis termed planet-carrier. The sun gear, the ring gear and the planet-carrier are planetary elements because their axes of revolution are the same as the longitudinal axis X of the turbine engine. Each planet gear has a different axis of revolution, evenly distributed over a single operating diameter around the axis of the planetary elements. These axes are parallel with the longitudinal axis X.

There are several reduction gear architectures. According to the state of the art in the field of bypass turbine engines, reduction gears are of the planetary or epicyclic type. In other similar applications, "differential" or compound architectures can be found.

In a planetary reduction gear, the planet carrier is fixed, and the ring gear constitutes the output shaft of the device that rotates in the opposite direction with respect to the sun gear.

In an epicyclic reduction gear, the ring gear is fixed, and the planet-carrier constitutes the output shaft of the device that rotates in the same direction as the sun gear.

In a differential reduction gear, no element is rotationally fixed. The ring gear rotates in the opposite direction with respect to the sun gear and the planet-carrier.

The reduction gears can comprise one or several gearing stages. This gearing is achieved in different ways, such as by contact, by friction and even by magnetic fields.

There are several types of contact gearing, such as straight, helical or herringbone gearings.

The present invention proposes to an improvement of a reduction gear with a simple, efficient and economical solution to improve the lubrication of its planet-carrier.

SUMMARY OF THE INVENTION

The Invention Features Several Aspects.

According to a first aspect, the invention relates to a planet-carrier for a mechanical reduction gear of a turbine engine, in particular of an aircraft, said planet-carrier comprising a cage defining an internal housing intended to receive a central sun gear with an axis of rotation X, and an annular row of planet gears arranged around the sun gear, said cage comprising two annular radial walls with respect to said axis X, and connected to one another at their outer periphery by a cylindrical wall of axis X, at least one of these radial walls comprising a mounting orifices of the axes of said planet gears, and the cylindrical wall comprising through-holes of the passage of the gearings of the planet gears so that they may engage with a gearing of the ring gear, which is intended to extend around the planet gears and the cage, characterised in that it comprises first and second independent lubrication circuits, the first circuit comprising a first oil inlet connected by a first annular oil chamber extending around the axis X to ducts supplying oil to said axes of the planet gears, and the second circuit comprising an second oil inlet connected by a second annular oil chamber extending around the axis X to channels supplying oil to the gearings of the planet gears with the ring gear, and in that said cage, said first and second inlets, said ducts, said channels and at least a portion of said first and second chambers are formed of a single part.

The invention thus proposes integrating a major portion of the lubrication circuits in the cage of the planet-carrier, which reduces the number of parts and facilitates the assembly of the reduction gear. Furthermore, the risks of oil leaks are thus greatly reduced.

The planet carrier according to the invention can comprise one or several of the following characteristics, taken individually or in combination:
- said first and second inlets are oriented radially with respect to said axis X and open radially outwards; they are thus easily accessible for the purpose of connecting them to oil supply means,
- said first and second inlets are located in a same plane that is perpendicular to said axis X and are at an angle with respect to one another; they are therefore close to one another and can pass through a same arm or through different arms of a crankcase of the turbine engine wherein the reduction gear is integrated with this planet-carrier,
- said first and second chambers are arranged adjacent to one another, one behind the other, along said axis X; this optimises the compactness and therefore the dimensions of the lubrication circuits,
- one of said first and second chambers is located in said plane and connected to one of said inlets by a radial and rectilinear drill hole, and the other of said first and second chambers is located outside of said plane and connected to the other of said inlets by two drill holes, wherein a first drill hole being located in said plane and a second drill hole extending at an angle between the first drill hole and this other chamber; this also optimises the compactness and therefore the dimensions of the lubrication circuits; these open drills holes are preferably sealed by plugs that can be screwed and/or glued.
- said ducts are formed in one of said radial walls and extend in a rectilinear manner between said first chamber and a lubricating cores of the axes of the planet gears; the ducts are thus formed in the thickness of the radial walls, or in excess thickness provided in these walls,
- said channels are formed in one of said radial walls and in said cylindrical wall, and each is generally L-shaped, extending between said second chamber and a projecting oil orifices towards said gearings; the channels are thus formed in the thickness of the radial and cylindrical walls, or in excess thickness provided in these walls, said first and second chambers are located on the inner periphery of one of said radial walls, and are partially delimited by this radial wall, and partially by an attached annular distributor comprising a cylindrical wall delimiting, internally, said chambers and at least an annular partition axially closing one of said chambers, one of said chambers is connected to at least one nozzle spraying oil towards said sun gear, said nozzle being integrated in said distributor; the nozzle is preferably configured to project oil towards the coupling of the sun gear and its drive shaft, said second circuit further comprises channels supplying oil to the gearings of the planet gears with the sun gear, each of said first and second chambers has in cross-section a general parallelepiped shape.

According to a second aspect, the invention relates to a planet-carrier for a mechanical reduction gear of a turbine engine, in particular of an aircraft, said planet-carrier comprising a cage defining an internal housing intended to receive a central sun gear with an axis of rotation X, and an annular row of planet gears arranged around the sun gear, said cage comprising two annular radial walls that are radial with respect to said axis X, and connected to one another at their outer periphery by a cylindrical wall of axis X, at least one of these radial walls comprising a mounting orifices of the axes of said planet gears, and the cylindrical wall comprising through-holes for the passage of the gearings of the planet gears so that they may engage with a gearing of the ring gear, which is intended to extend around the planet gears and the cage, characterised in that it further comprises an annular distributor of lubricating oil which is formed of a single part and configured to be provided and secured to the inner periphery of one of said radial walls, so as to define, together with said radial wall, two annular chambers which are independent and sealed to oil circulation.

The manufacturing of the oil chambers is simplified since they are delimited between the cage, on one hand, and by the attached distributor, on the other hand. It is indeed easier and more cost-efficient to manufacture the distributor with casting operations or by machining a part, rather than manufacturing the chambers entirely on the cage, at the assembly site. The distributor has a general shape that is simple, and it is formed of a single part, which facilitates its mounting on the cage.

The planet-carrier according to the invention can comprise one or several of the following characteristics, taken individually or in combination:

said distributor comprises a cylindrical wall delimiting internally said chambers and at least an annular partition axially closing one of said chambers; the simply shaped distributor can therefore be cheap to manufacture, said distributor comprises two annular walls that extend radially outwards from said cylindrical wall and that together delimit one of said chambers, the other of said chambers being delimited by one of these partitions and an annular surface facing the radial wall on which the distributor is attached, the or each partition comprises on its outer periphery an external cylindrical centring surface on which is formed an annular groove intended to receive an annular seal intended to cooperate with the inner periphery of the radial wall on which the distributor is attached; the cylindrical surfaces therefore serve a dual purpose of centring but also of sealing, owing to the fact that they are provided with seals that ensure that the chambers, and therefore the lubrication circuits, are properly sealed, said cylindrical wall comprises a cylindrical centring surface on which an annular groove is formed to receive an annular seal intended to cooperate with the inner periphery of the radial wall on which the distributor is attached; this cylindrical surface also serves a dual centring and sealing purpose, said first and second chambers are arranged adjacent to one another, one behind the other, along said axis X, said first and second chambers have each a cross-section that has a general parallelepiped shape, the distributor comprises a flange, or a fixation lugs onto said cage, by means of screws, an inner cylindrical surface of the inner periphery of said radial wall on which the distributor is attached, comprises a protruding annular rib configured to cooperate with said annular seal, an oil nozzle is connected to one of said chambers, and the oil nozzle is integrated in the distributor, preferably on said cylindrical wall.

The present invention also relates to a reduction gear for a turbine engine, in particular of an aircraft, comprising a sun gear mounted rotationally secure on a drive shaft around an axis of rotation X, a ring gear coaxial with the axis X and a plurality of planet gears arranged around the axis X, said planet gears being engaged with the sun gear and the annular ring gear that extends around the planet gears; said planet gears are movably mounted on the planet-carrier according to one of the features of the invention.

The drive shaft can be a low-pressure shaft of the turbine engine.

The present invention also relates to an aircraft turbine engine, characterised in that it comprises a mechanical reduction gear comprising a planet-carrier such as described above.

The characteristics of the different aspects of the invention can be combined with one another.

BRIEF DESCRIPTION OF THE FIGURES

Other characteristics and advantages will appear more clearly upon reading the following description of a non-limiting embodiment of the invention and with reference to the appended drawings, in which:

FIG. 7a is a schematic axial cross-section view of the reduction gear of FIG. 3, the cross-section being made in a plane, FIG. 7b is another schematic axial cross-section view of the reduction gear of FIG. 3, the cross-section being made in a different plane, and FIG. 7c is another schematic axial cross-section view of the reduction gear of FIG. 3, the cross-section being made in a different plane.

DETAILED DESCRIPTION OF THE INVENTION

Figure 1:
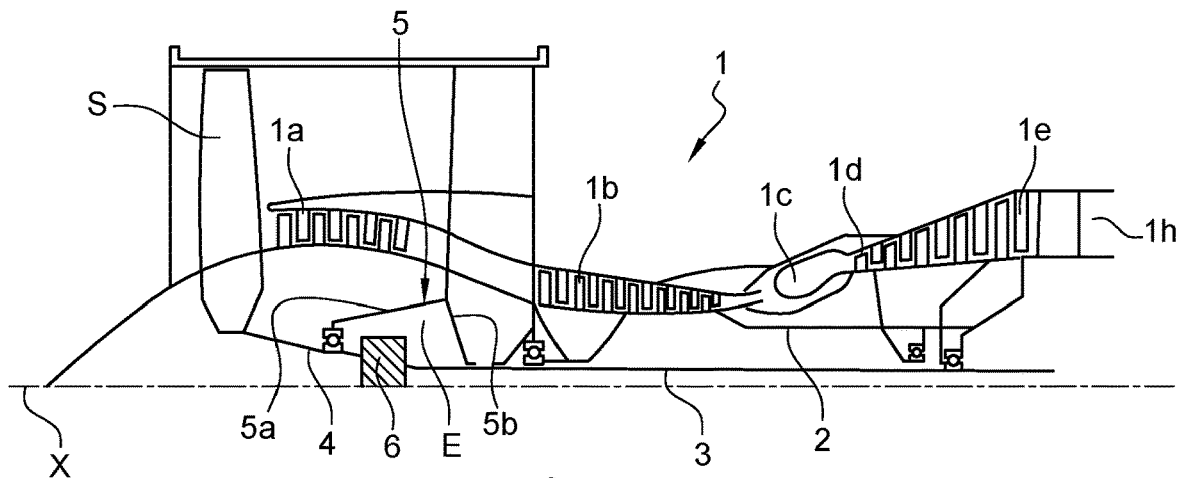
FIG. 1 is a schematic axial cross-section view of a turbine engine using the invention.

FIG. 1 describes a turbine engine 1 that comprises, conventionally, a fan S, a low-pressure compressor 1a, a high-pressure compressor 1b, an annular combustion chamber 1c, a high-pressure turbine 1d, a low-pressure turbine 1e, and an exhaust pipe 1h. The high-pressure compressor 1b and the high-pressure turbine 1d are connected by a high-pressure shaft 2 and form with the latter a high-pressure (HP) body. The low-pressure compressor 1a and the low-pressure turbine 1e are connected by a low-pressure shaft 3 and form with the latter a low-pressure (LP) body.

The fan S is driven by a fan shaft 4, which is driven with the LP shaft 3 by means of a reduction gear 6. The reduction gear 6 is generally of the planetary or the epicyclic type.

Although the following description relates to a planetary reduction gear or an epicyclic reduction gear, it also applies to a mechanical differential in which the three components, i.e. the planet-carrier, the ring gear and the sun gear are rotationally mobile, the rotation speed of one of these components depending in particular on the speed difference of the two other components.

The reduction gear 6 is positioned in the front part of the turbine engine. A fixed structure comprising schematically, in this case, an upstream part 5a and a downstream part 5b, constituting the engine crankcase or stator 5, is arranged to form an enclosure E around the reduction gear 6. This enclosure E is here closed in the upstream part by seals located at the level of a bearing and allowing the passage of the fan shaft 4, and in the downstream section by seals located at the level of the passage of the LP shaft 3.

Figure 2:
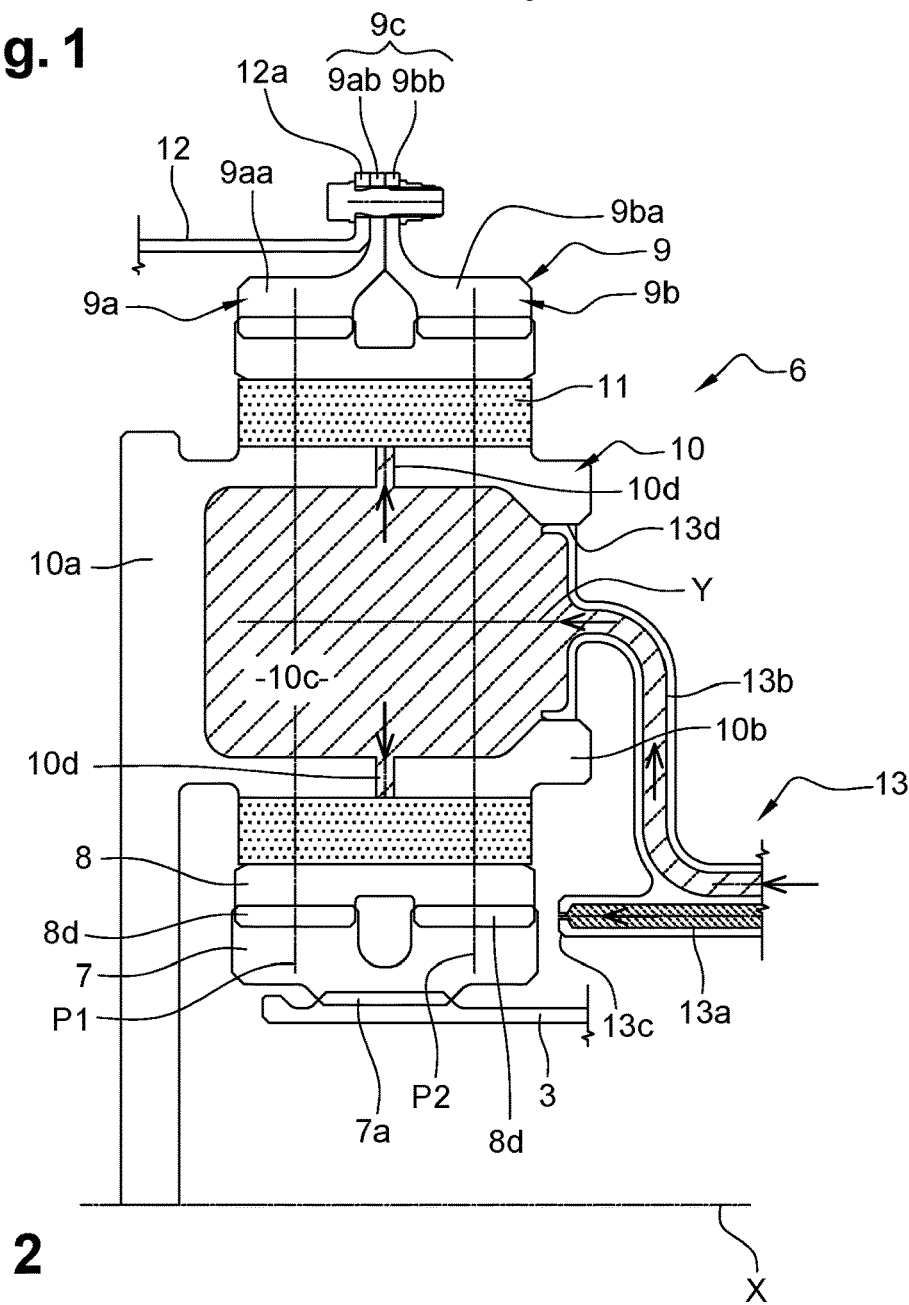
FIG. 2 is a partial view showing an axial cross-section of a mechanical reduction gear.

FIG. 2 shows a reduction gear 6 that can have different architectures depending on whether some parts are fixed or rotating. At the inlet, the reduction gear 6 is connected to the LP shaft 3, for example by means of inner splines 7a. The LP shaft 3 drives a planet pinion termed sun gear 7. Conventionally, the sun gear 7, of which the axis of rotation is the same as that of the turbine engine X, drives a series of pinions termed planet gears 8, these planet gears being evenly distributed over a single diameter around the axis of rotation X. This diameter is equal to twice the operating distance between the sun gear 7 and the planet gears 8. The number of planet gears 8 generally ranges from three to seven for this type of application.

The set of the planet gears 8 is held by a chassis termed planet-carrier 10. Each planet gear 8 rotates about its own axis Y and engages with the ring gear 9.

At the output, this provides:
  in an epicyclic configuration, the planet gears 8 rotationally drive the planet-carrier 10 about the axis X of the turbine engine. The ring gear is secured to the engine crankcase or the stator 5 by means of a ring-carrier 12 and the planet-carrier 10 is secured to the fan shaft 4.
  in a planetary configuration, the planet gears 8 are held by a planet-carrier 10 that is secured to the engine crankcase or the stator 5. Each planet gear drives the ring gear, which is supported on the fan shaft 4 by means of a ring-carrier 12.

Each planet gear 8 is mounted free to rotate by means of a bearing 11, for example a roller bearing or a hydrodynamic bearing. Each bearing 11 is mounted on one of the axes 10b of the planet-carrier 10 and all the axes are positioned with respect to one another by means of one or several structural chassis 10a of the planet-carrier 10. The number of axes 10b and of bearings 11 is equal to the number of planet gears. For operating, assembly, manufacturing, control, repairs or replacement reasons, the axes 10b and the chassis 10a can be divided into several parts.

For the reasons mentioned above, the gearing of a reduction gear can be divided into several helices, each with a median plane P. In this example, we will detail the operation of a reduction gear with several helices and with a ring gear divided into two half-ring gears:
  a front half-ring gear 9a consisting of a rim 9aa and an attachment half-flange 9ab. The rim 9aa comprises the front helix of the gearing of the reduction gear. This front helix engages with that of the planet gear 8, which in turn engages with that of the sun gear 7.
  a rear half-ring gear 9b consisting of a rim 9ba and an attachment half-flange 9bb. The rim 9ba comprises the rear helix of the gearing of the reduction gear. This rear helix engages with that of the planet gear 8, which in turn engages with that of the sun gear 7.

In the case of herringbone gearings, if the helix widths vary between the sun gear 7, the planet gears 8, and the ring gear 9 because of overlapping gearings, they are all centred on a median plane P1 for the front helixes, and on another median plane P2 for the rear helixes. The other figures relate to the case of a bearing with two rows of rollers.

The attachment half-flange 9ab of the front half-ring gear 9a and the attachment half-flange 9bb of the rear half-ring gear 9b form the attachment flange 9c of the ring gear. The ring gear 9 is secured to the ring-carrier 12 by assembling the attachment flange 9c of the ring gear to the attachment flange 12a of the ring-carrier by means of a bolted assembly for example.

The arrows of FIG. 2 show the path of the oil in the reduction gear 6. The oil arrives in the reduction gear 6 from the stator part 5 in a distributor 13 by different means that are not detailed in this view as they are specific to one or several types of architecture. The distributor 13 is divided into two parts, and generally each part has the same number of planet gears. The purpose of the injectors 13a is to lubricate the gearings and the purpose of the arms 13b is to lubricate the bearings. The oil is brought to the injector 13a, exiting at its end 13c to lubricate the gearings. The oil is also brought to the arm 13b and circulates through the supply intake 13d of the bearing. The oil then circulates through the axis 10b or in one or several buffer zones 10c to then exit through the orifices 10d in order to lubricate the bearings 11 of the planet gears 8.

FIGS. 3 to 7 show an embodiment of a reduction gear 6 comprising several aspects of the invention.

One of these aspects relates to the lubricating oil distributor 13' and another relates to the lubricating oil circuits 15a, 15b of the reduction gear 6.

Figure 5:
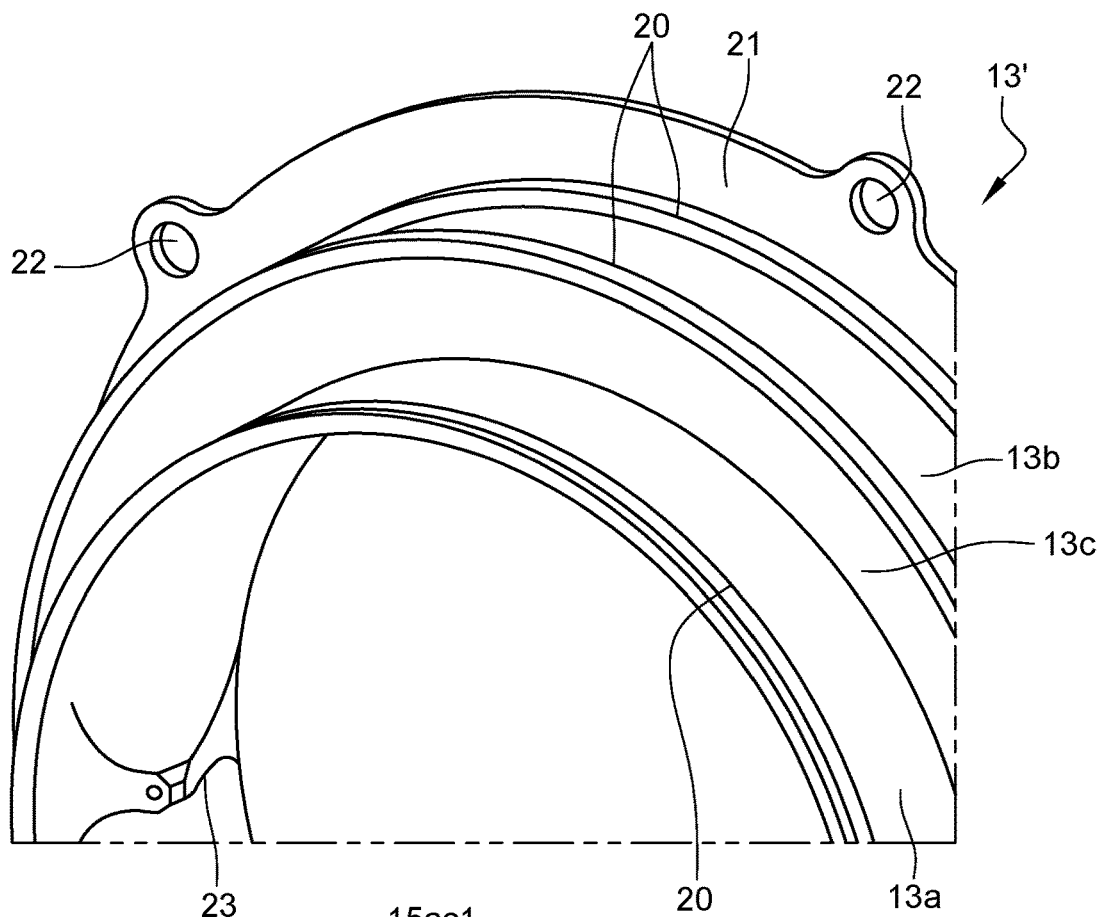
FIG. 5 is a partial, schematic and perspective view of an annular distributor of lubricating oil.

The reduction gear 6 of the FIG. 5 and following is similar to that described above and comprises a planet-carrier 10 attached with a cage 14.

The cage 14 comprises two radial annular walls 14a, 14b that extend around the axis X, these walls 14a, 14b being parallel and being respectively a front radial wall 14a and a rear radial wall 14b. The walls 14a, 14b are connected to one another at their outer peripheries by a cylindrical wall 14c. The walls 14a, 14b and 14c are more visible in FIGS. 7a to 7c.

The cage 14 defines an internal housing intended to receive the central sun gear 7 with an axis of rotation X, and the annular row of planet gears 8 arranged around the sun gear 7.

At least one of the radial walls 14a, 14b (the front wall 14a in the example shown in FIGS. 7a to 7c) comprises orifices 14aa for mounting the axes 10b of the planet gears 8, and the cylindrical wall 14c comprises through-holes 14ca for the passage of the gearings of the planet gear 8 so that they may engage with the gearing of the ring gear 9 intended to extend around the planet gears 8 and the cage 14.

The orifices 14aa are regularly distributed about the axis X. Each of the walls 14a, 14b further comprises a central orifice 14ab, 14ba aligned with the axis X. The walls 14a, 14b can further be connected to one another by another cylindrical wall 14d extending over the inner periphery of the walls 14a, 14b, around the orifices 14ab, 14ba. This wall 14d is visible in FIG. 7b.

Figure 6:
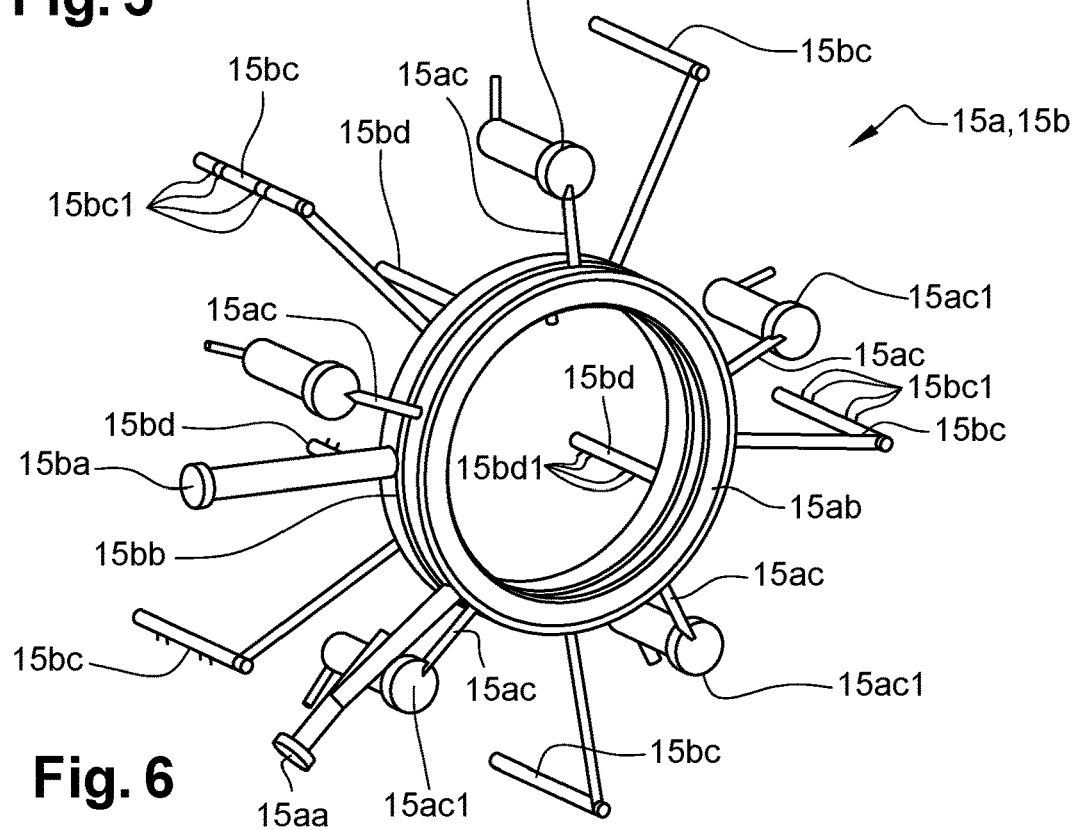
FIG. 6 is a schematic perspective view of the volumes of the lubricating oil circuits of the reduction gear of FIG. 3.

The reduction gear 6 comprises two lubrication circuits 15a, 15b that are independent, the oil volumes of these circuits being visible in FIG. 6.

The first circuit 15a comprises a first oil inlet 15aa connected by a first annular oil chamber 15ab extending about the axis X to ducts 15ac supplying oil to the axes 10b of the planet gears 8.

The second circuit 15b comprises a second oil inlet 15ba connected by a second annular oil chamber 15bb extending about the axis X to channels 15bc supplying oil to the gearings of the planet gears 8 with the ring gear 9. The second circuit 15b can further comprise channels 15bd supplying oil to the gearings of the planet gears 8 with the sun gear 7.

As can be seen in the drawings, the inlets 15aa, 15ba, the ducts 15ac, the channels 15bc, 15bd, and at least a portion of the chambers 15ab, 15bb are integrated in the cage 15, i.e. they are not formed by or in the parts attached on the cage but are an integral part of the cage.

The inlets 15aa, 15ba are oriented radially with respect to said axis X and open radially outwards for the purpose of their connection to oil supply means. These inlets 15aa, 15ba are located in a same plane P3, perpendicular to the axis X and at an angle with respect to one another in this plane P3, about the axis X (FIGS. 7a and 7b).

The chambers 15ab, 15bb are arranged adjacent to one another, one behind the other, along said axis X. They each have a general parallelepiped shape in the example shown. One of these chambers, specifically the front chamber 15bb in the example shown, is located in the abovementioned plane P3 and is connected to the inlet 15ba by a radial and rectilinear drill hole 16a formed in the rear radial wall 14b (FIGS. 7b and 7c). The other chamber 15ab is located outside of the plane P3 (in this case behind the plane) and is connected to the other inlet 15aa by two drill holes, a first drill hole 16b being located in the plane P3 and a second drill hole 16c extending at an angle from the first drill hole 16b to the chamber 15ab (FIG. 7a).

The ducts 15ac are formed in the rear radial wall 14b and extend in a rectilinear manner and at a slight angle between the chamber 15ab and the cores 17 supplying oil to the planet gears 8 (FIG. 7a).

The channels 15bc are formed in the rear radial wall 14b and in the cylindrical wall 14c (FIG. 7c). They each have a general L shape and each comprises a rectilinear and radial branch that extends in the wall 14b from the chamber 15bb, and an axial rectilinear branch extending in the wall 14c to the orifices 15bc1 projecting oil towards the gearings of the planet gears 8 with the ring gear 9 (FIGS. 7c and 6).

The channels 15bd are formed in the wall 14d and extend from the chamber 15bb to the orifices 15bd1 for projecting oil towards the gearings of the planet gears 8 with the sun gear 7 (FIGS. 6 and 7b).

Figure 3:
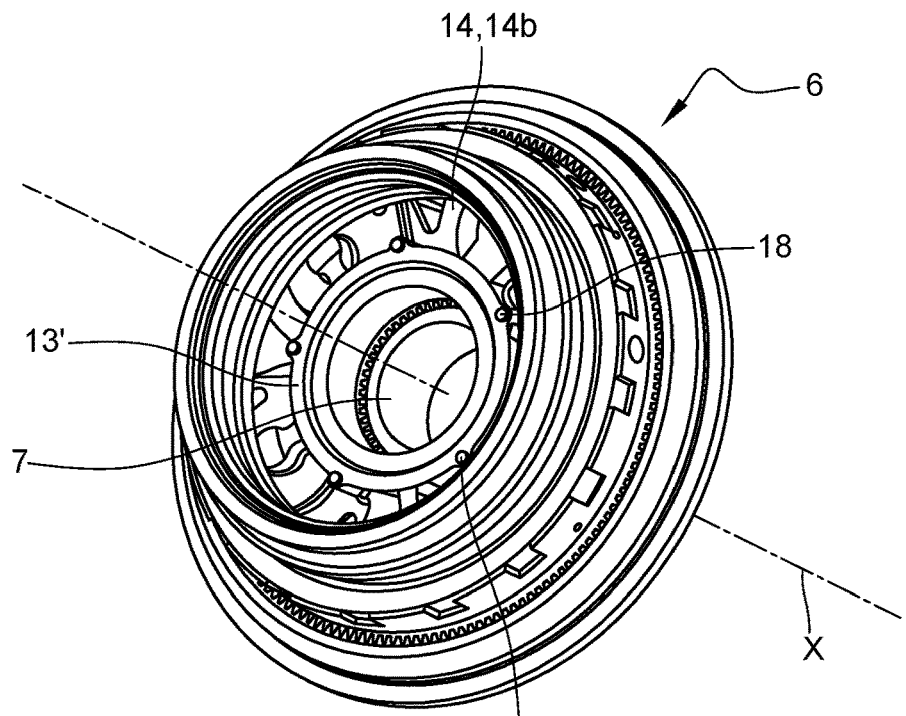
FIG. 3 is a schematic and perspective view of a mechanical reduction gear according to the invention.
Figure 4:
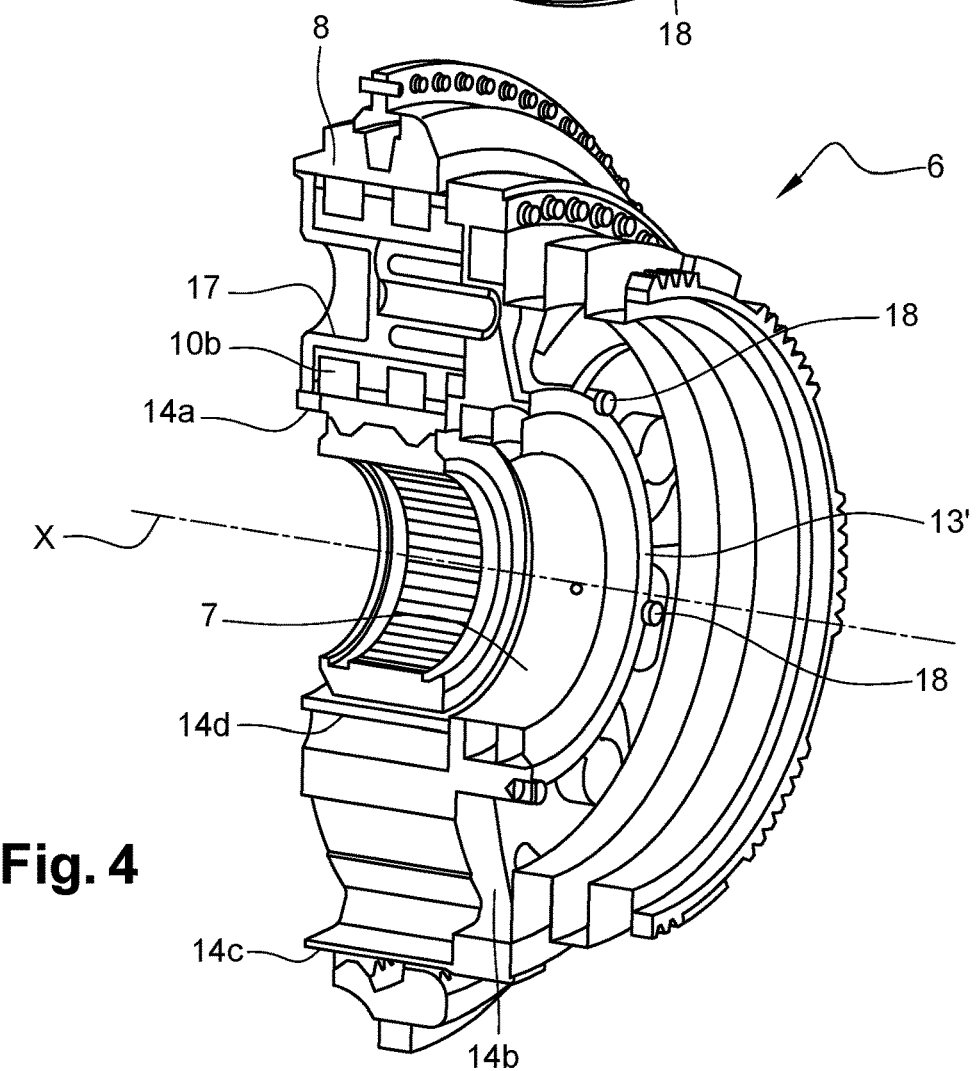
FIG. 4 is a schematic axial cross-section view of the reduction gear of FIG. 3.

The chambers 15ab, 15bb are located at the inner periphery of the wall 14b, and are partially delimited by this radial wall, and partially by the distributor 13' attached on this wall and secured thereto by means of screws 18 (FIGS. 3 and 4).

The inner periphery of the wall 14b comprises a cylindrical wall 19 oriented towards the rear and comprising an internal cylindrical surface 19a on which open the radially internal ends of the drill holes 16a, 16c, of the ducts 15ac, and of the channels 15bc (FIGS. 7a to 7c). A rear radial surface 19b of the wall 14b extends from the central orifice 14bb of the wall 14b to the surface 19a. The channels 15bd open axially in the downstream direction onto the surface 19b (FIG. 7b).

The distributor 13' has a generally annular shape and is formed of a single part. It comprises a cylindrical wall 13a delimiting internally the chambers 15ab, 15bb, the chambers being intended to be delimited externally by the surface 19a of the wall 14b when the distributor 13' is mounted coaxially on the wall 14b by engaging it inside the edge and the orifice 14bb of the wall 14b.

The distributor 13' comprises two annular partitions 13b, 13c that are substantially radial in the example shown. One of the partitions 13c extends radially outwards from the rear end of the wall 13a and is supported radially, in a sealed manner, by the surface 19a, here at the rear end of the edge 19.

Thy cylindrical wall 13a of the distributors 13' has a front end that is supported radially, in a sealed manner, by the peripheral edge of the orifice 14bb. The partition 13b extends radially outwards, at a distance from the upstream end of the wall 13a and of the partition 13b, and is also supported radially, in a sealed manner, by the surface 19a.

Each sealed support is achieved, in the example shown, by an O-ring that is arranged in an annular groove 20 of the outer periphery of the partition 13b, 13c, or of the front end of the wall 13a, and that cooperates by support and elastic deformation with the radial wall 14b or its edge 19.

To facilitate the centring of the distributor 13' and the forming of grooves 20 on the partitions 13b, 13c, the latter can be oversized at their outer peripheries and each can comprise a centring cylindrical surface on which is formed the groove 20 receiving a seal. Furthermore, to facilitate the mounting of the distributor 13' by an axial translational movement in the orifice 14bb and the edge 19, the seal supported by the partition 13b can cooperate with an annular rib 19d protruding on the surface 19a, as can be seen in FIGS. 7b and 7c.

It should be understood that the chamber 15bb is closed by the distributor 13' and delimited between a front annular portion of the surface 19a, the surface 19b, a front annular portion of the wall 13a, and the partition 13c. The chamber 15ab is closed by the distributor 13' and delimited between a rear annular portion of the surface 19a, a rear annular portion of the wall 13a, and the partition 13b, 13c.

The chambers 15ab, 15bb are independent since they do not communicate with one another.

The distributor 13', and in particular its partition 13b, comprise an annular flange 21 that extends radially outwards and comprises orifices 22 for the passage of screws 18 that are screwed into the tapped orifices of the wall 14b of the cage.

The distributor 13' further comprises, protruding on the internal cylindrical surface of its wall 13a, an oil nozzle 23 that is connected to the front chamber 15*bb* (FIGS. 5 and 7*a*). This nozzle 23 is configured to project oil on the coupling of the sun gear 7 and the low-pressure shaft 3 of FIG. 2.

The nozzle 23 is also advantageously integrated in the distributor 13', as can be seen in the example shown.

The oil circuits 15*a*, 15*b* are advantageously configured to be fluidly, connected at the level of their inlets and their possible outlets, by male-female fittings, i.e. by connections that only require fitting along an axial direction of motion of a male connector into a female connector. Even if a connector is presented in the following description as being male and intended to engage with a female connector, it can alternatively be replaced by a female connector intended, therefore, to engage with a male connector, and conversely. The sealing of the male-female connectors can be provided by O-rings or similar seals.

With regard to the inlets 15*aa*, 15*ba*, each one comprises a female connector in the example shown, intended to receive the male connector of an oil supply pipe (FIGS. 6 to 7*c*).

Regarding the oil outlets, excluding the orifices 15*bc*1, 15*bd*1 for the projection of oil, they are located at the radially external ends of the ducts 15*ac* (FIGS. 6 and 7*a*).

As can be seen in FIG. 7*a*, each of the outlets of the ducts 15*ac* comprises a female connector 15*ac*1 in the example shown, intended to receive the male connector of one of the cores 17. These connectors 15*ac*1 are oriented axially, all in the same direction, which here is forwards.

The purpose of the cores 17 is to lubricate and cool the axes 10*b* of the planet gears 8.

In the example embodiment shown, each axis 10*b* is guided by a double roller bearing 11, i.e. with double rows of rollers 11*a*. The two rows extend about a single axis that corresponds to the axis, marked Y of the axis 10*b* of the planet gear 8. The application can also comprise more than two rows.

Conventionally, the rollers are guided in tracks defined by inner and outer rings. A feature here is that the inner rings for guiding the rollers 11*a* are integrated in the axis 10*b*. The outer periphery of the axis 10*b* therefore comprises cylindrical tracks 11*b* for the rolling of the rollers 11*a*, each track 11*b* being axially delimited by annular ribs 11*c*, the purpose of which is to guide the cages 11*d* maintaining the rollers 11*a*. Furthermore, FIGS. 7*a* to 7*c* show that the outer rings are integrated at the inner periphery of the planet gears 8. The inner periphery of the planet gears 8 thus comprises cylindrical tracks 8*a* for rolling the rollers 11*a*.

The inner periphery of the axis 10*b* comprises an internal cylindrical surface 10*e* intended to be covered by the core 17.

This core 17 essentially comprises three parts, i.e. a cylindrical portion 17*a*, a disc 17*b* and a ring 17*c*. The core 17 is in this case formed from a single part, but this characteristic is not limiting.

The portion 17*a* extends along the axis Y and comprises an inner duct, termed first duct 17*a*1, that extends along the axis Y over nearly the entire length of the portion 17*a* in the example shown.

The portion 17*a* has an axial (rear) end forming the abovementioned male connector, and an opposite end (front) connected to the centre of the disc 17*b*, the outer periphery of which is connected to the ring 17*c*. The disc 17*b* extends in a plane that is substantially perpendicular to the axis Y and comprises an inner duct, termed second duct 17*b*1, that extends radially from the first duct 17*a*1 to the external annular surface of the disc 17*b*.

The disc 17*b* is substantially connected to the middle of the ring 17*c* (along the axis Y), so that the second duct substantially opens onto the middle of the ring 17*c*. The disc 17*b* could comprise several second radial ducts 17*b*1 regularly spaced about the axis Y.

The ring 17*c* extends about the axis Y and delimits with the internal cylindrical surface of the axis 10*b* an annular cavity 22 for the circulation of oil and for the supply of the orifices 10*d* transporting the oil to the bearing 11 and to the cages 11*d*, these orifices being visible in FIG. 2.

In use, the oil reaches the chambers 15*ab*, 15*bb* through the inlets 15*aa*, 15*ba* and the drill holes 16*a*, 16*b* and 16*c*. The oil in the chamber 15*ab* supplies the cores 17 through the ducts 15*ac* for the purpose of lubricating the bearing 11. The oil in the chamber 15*bb* supplies the channels 15*bc*, 15*bd* for the purpose of lubricating the gearings. Oil is further projected by the nozzle 23 onto the coupling of the sun gear 7 with the LP shaft 3.

The invention claimed is:

1. A planet-carrier for a mechanical reduction gear of a turbine engine, said planet-carrier comprising a cage defining an internal housing intended to receive a central sun gear with an axis of rotation X, and an annular row of planet gears arranged around the sun gear, said cage comprising two annular radial walls with respect to said axis X, and connected to one another at their outer periphery by a cylindrical wall of axis X, at least one of these radial walls comprising a mounting orifices of the axes of said planet gears, and the cylindrical wall comprising through-holes of the passage of the gearings of the planet gears so that they may engage with a gearing of a ring gear, which is intended to extend around the planet gears and the cage, wherein it comprises first and second independent lubrication circuits, the first circuit comprising a first oil inlet connected by a first annular oil chamber extending around the axis X to ducts supplying oil to said axes of the planet gears, and the second circuit comprising an second oil inlet connected by a second annular oil chamber extending around the axis X to channels supplying oil to the gearings of the planet gears with the ring gear, and in that said cage, first and second inlets, said ducts, said channels and at least a portion of said first and second chambers are formed of a single part.

2. The planet-carrier according to claim 1, wherein said first and second inlets are oriented radially with respect to said axis X and open radially outwards.

3. The planet-carrier according to claim 2, wherein said first and second inlets are located in a same plane that is perpendicular to said axis X and are at an angle with respect to one another.

4. The planet-carrier according to claim 1, wherein said first and second chambers are arranged adjacently, one behind the other, along said axis X.

5. The planet-carrier according to claim 3, wherein one of said first and second chambers is located in said plane and connected to one of said inlets by a radial and rectilinear drill hole, and the other of said first and second chambers is located outside of said plane and connected to the other of said inlets by two drill holes, wherein a first drill hole being located in said plane and a second drill hole extending at an angle between the first drill hole and the other chamber, and wherein said first and second chambers are arranged adjacently, one behind the other, along said axis X.

6. The planet-carrier according to claim 1, wherein said ducts are formed in one of said radial walls and extend in a rectilinear manner between said first chamber and a lubricating core of said axes of the planet gears.

7. The planet-carrier according to claim 1, wherein said channels are formed in one of said radial walls as well as in said cylindrical wall and each has a general L shape extending between said second chamber and the orifices projecting oil towards said gearings.

8. The planet-carrier according to claim 1, wherein said first and second chambers are located on the inner periphery of one of said radial walls, and are partially delimited by this radial wall, and partially by an attached annular distributor comprising a cylindrical wall delimiting, internally, said chambers and at least an annular partition axially closing one of said chambers.

9. The planet-carrier according to claim 8, wherein one of said chambers is connected to at least one nozzle spraying oil towards said sun gear, said nozzle also being integrated in said distributor.

10. The planet gear according to one claim 1, wherein said first and second chambers each have in cross-section a general parallelepiped shape.

11. The planet-carrier according to claim 1, wherein said second circuit further comprises channels supplying oil to the gearings of the planet gears with the sun gear.

12. A reduction gear for a turbine engine, comprising a sun gear mounted rotationally secure on a drive shaft around an axis of rotation X, an annular ring gear coaxial with the axis X and a plurality of planet gears arranged around the axis X, said planet gears being engaged with the sun gear and the annular ring gear that extends around the planet gears, wherein said planet gears are mounted mobile on the planet-carrier according to claim 1.

13. A turbine engine of an aircraft comprising a mechanical reduction gear comprising a planet-carrier according to claim 1.

14. A planet-carrier for a mechanical reduction gear of a turbine engine, said planet-carrier comprising a cage defining an internal housing intended to receive a central sun gear with an axis of rotation X, and an annular row of planet gears arranged around the sun gear, said cage comprising two annular radial walls with respect to said axis X, and connected to one another at their outer periphery by a cylindrical wall of axis X, at least one of these radial walls comprising a mounting orifices of the axes of said planet gears, and the cylindrical wall comprising through-holes of the passage of the gearings of the planet gears so that they may engage with a gearing of a ring gear, which is intended to extend around the planet gears and the cage,
wherein it comprises first and second independent lubrication circuits, the first circuit comprising a first oil inlet connected by a first annular oil chamber extending around the axis X to ducts supplying oil to said axes of the planet gears, and the second circuit comprising an second oil inlet connected by a second annular oil chamber extending around the axis X to channels supplying oil to the gearings of the planet gears with the ring gear, and in that said cage, first and second inlets, said ducts, said channels and at least a portion of said first and second chambers are formed of a single part, and
wherein said first and second inlets are oriented radially with respect to said axis X and open radially outwards.

15. A planet-carrier for a mechanical reduction gear of a turbine engine, said planet-carrier comprising a cage defining an internal housing intended to receive a central sun gear with an axis of rotation X, and an annular row of planet gears arranged around the sun gear, said cage comprising two annular radial walls with respect to said axis X, and connected to one another at their outer periphery by a cylindrical wall of axis X, at least one of these radial walls comprising a mounting orifices of the axes of said planet gears, and the cylindrical wall comprising through-holes of the passage of the gearings of the planet gears so that they may engage with a gearing of a ring gear, which is intended to extend around the planet gears and the cage,
wherein it comprises first and second independent lubrication circuits, the first circuit comprising a first oil inlet connected by a first annular oil chamber extending around the axis X to ducts supplying oil to said axes of the planet gears, and the second circuit comprising an second oil inlet connected by a second annular oil chamber extending around the axis X to channels supplying oil to the gearings of the planet gears with the ring gear, and in that said cage, first and second inlets, said ducts, said channels and at least a portion of said first and second chambers are formed of a single part,
wherein said first and second inlets are located in a same plane that is perpendicular to said axis X and are at an angle with respect to one another,
wherein one of said first and second chambers is located in said plane and connected to one of said inlets by a radial and rectilinear drill hole, and the other of said first and second chambers is located outside of said plane and connected to the other of said inlets by two drill holes, wherein a first drill hole being located in said plane and a second drill hole extending at an angle between the first drill hole and the other chamber, and
wherein said first and second chambers are arranged adjacently, one behind the other, along said axis X.

16. A planet-carrier for a mechanical reduction gear of a turbine engine, said planet-carrier comprising a cage defining an internal housing intended to receive a central sun gear with an axis of rotation X, and an annular row of planet gears arranged around the sun gear, said cage comprising two annular radial walls with respect to said axis X, and connected to one another at their outer periphery by a cylindrical wall of axis X, at least one of these radial walls comprising a mounting orifices of the axes of said planet gears, and the cylindrical wall comprising through-holes of the passage of the gearings of the planet gears so that they may engage with a gearing of a ring gear, which is intended to extend around the planet gears and the cage,
wherein it comprises first and second independent lubrication circuits, the first circuit comprising a first oil inlet connected by a first annular oil chamber extending around the axis X to ducts supplying oil to said axes of the planet gears, and the second circuit comprising an second oil inlet connected by a second annular oil chamber extending around the axis X to channels supplying oil to the gearings of the planet gears with the ring gear, and in that said cage, first and second inlets, said ducts, said channels and at least a portion of said first and second chambers are formed of a single part, and
wherein said channels are formed in one of said radial walls as well as in said cylindrical wall and each has a general L shape extending between said second chamber and the orifices projecting oil towards said gearings.

17. A planet-carrier for a mechanical reduction gear of a turbine engine, said planet-carrier comprising a cage defining an internal housing intended to receive a central sun gear with an axis of rotation X, and an annular row of planet gears arranged around the sun gear, said cage comprising two annular radial walls with respect to said axis X, and connected to one another at their outer periphery by a cylindrical wall of axis X, at least one of these radial walls comprising a mounting orifices of the axes of said planet gears, and the cylindrical wall comprising through-holes of the passage of the gearings of the planet gears so that they may engage with a gearing of a ring gear, which is intended to extend around the planet gears and the cage, wherein it comprises first and second independent lubrication circuits, the first circuit comprising a first oil inlet connected by a first annular oil chamber extending around the axis X to ducts supplying oil to said axes of the planet gears, and the second circuit comprising an second oil inlet connected by a second annular oil chamber extending around the axis X to channels supplying oil to the gearings of the planet gears with the ring gear, and in that said cage, first and second inlets, said ducts, said channels and at least a portion of said first and second chambers are formed of a single part, wherein said first and second chambers are located on the inner periphery of one of said radial walls, and are partially delimited by this radial wall, and partially by an attached annular distributor comprising a cylindrical wall delimiting, internally, said chambers and at least an annular partition axially closing one of said chambers.

* * * * *